United States Patent
Sweeney et al.

(10) Patent No.: US 9,703,037 B2
(45) Date of Patent: Jul. 11, 2017

(54) RESONATOR OPTIMISATION

(71) Applicant: ASTRIUM LIMITED, Stevenage (GB)

(72) Inventors: Stephen Sweeney, Stevenage (GB); Yaping Zhang, Stevenage (GB)

(73) Assignee: ASTRIUM LIMITED, Hertfordshire (GB)

( * ) Notice: Subject to any disclaimer, the term of this patent is extended or adjusted under 35 U.S.C. 154(b) by 0 days.

(21) Appl. No.: 14/351,851

(22) PCT Filed: Oct. 9, 2012

(86) PCT No.: PCT/EP2012/069935
§ 371 (c)(1),
(2) Date: Apr. 14, 2014

(87) PCT Pub. No.: WO2013/053689
PCT Pub. Date: Apr. 18, 2013

(65) Prior Publication Data
US 2014/0233883 A1    Aug. 21, 2014

(30) Foreign Application Priority Data
Oct. 14, 2011    (EP) .................................... 11275129

(51) Int. Cl.
G02B 6/12    (2006.01)
G02B 6/293    (2006.01)

(52) U.S. Cl.
CPC ..... *G02B 6/12004* (2013.01); *G02B 6/29343* (2013.01); *G02B 6/29335* (2013.01);
(Continued)

(58) Field of Classification Search
CPC ............ G02B 6/29335; G02B 6/29343; G02B 6/29338; G02B 6/29341; G02B 6/29389; G02B 6/29391
(Continued)

(56) References Cited

U.S. PATENT DOCUMENTS 4,494,873 A * 1/1985 Perlmutter .............. H01S 3/083
356/467
4,720,160 A * 1/1988 Hicks, Jr. ................. G02B 6/02
359/891
(Continued)

FOREIGN PATENT DOCUMENTS

GB    2 470 115 A    11/2010
GB    2470115 A    11/2010
WO    WO 2007/014218 A2    2/2007

OTHER PUBLICATIONS

International Search Report (PCT/ISA/210) mailed on Mar. 13, 2013, by the European Patent Office as the International Searching Authority for International Application No. PCT/EP2012/069935.
(Continued)

*Primary Examiner* — Ryan Lepisto
*Assistant Examiner* — Guy Anderson
(74) *Attorney, Agent, or Firm* — Buchanan Ingersoll & Rooney PC

(57) ABSTRACT

A device comprising: a substrate; a plurality of resonators on the substrate, each of the resonators of the plurality of resonators being resonant at a predetermined wavelength of electromagnetic radiation and at least some of the resonators being arranged to operate in different resonance orders; a waveguide on the substrate, the waveguide being coupled to the plurality of resonators for guiding the electromagnetic radiation to the plurality of resonators, wherein the resonance order of each resonator along the waveguide is optimized to maximize the coupling of light into the resonators.

12 Claims, 3 Drawing Sheets

(52) U.S. Cl.
CPC ...... *G02B 6/29338* (2013.01); *G02B 6/29341* (2013.01); *G02B 6/29389* (2013.01); *G02B 6/29391* (2013.01)

(58) Field of Classification Search
USPC ............. 385/1, 14–15, 27–28, 123, 128–129
See application file for complete search history.

(56) References Cited

U.S. PATENT DOCUMENTS

| | | | | |
|---|---|---|---|---|
| 4,852,117 | A * | 7/1989 | Po | G02B 6/12007 372/6 |
| 5,483,378 | A * | 1/1996 | Rahn | G02B 1/115 216/24 |
| 6,633,696 | B1 | 10/2003 | Vahala et al. | |
| 6,865,314 | B1 * | 3/2005 | Blair | B82Y 20/00 385/15 |
| 8,106,379 | B2 * | 1/2012 | Bowers | B82Y 20/00 257/14 |
| 8,731,345 | B2 * | 5/2014 | Hanjani | G02B 6/122 385/129 |
| 9,002,147 | B2 * | 4/2015 | Akiyama | H01S 5/142 385/3 |
| 2001/0004411 | A1 | 6/2001 | Yariv | |
| 2002/0122615 | A1 * | 9/2002 | Painter | B82Y 20/00 385/15 |
| 2004/0223697 | A1 * | 11/2004 | Andersen | H01S 5/0687 385/39 |
| 2005/0135721 | A1 | 6/2005 | Painter et al. | |
| 2005/0135764 | A1 | 6/2005 | Painter et al. | |
| 2005/0207699 | A1 | 9/2005 | Painter et al. | |
| 2006/0039653 | A1 | 2/2006 | Painter et al. | |
| 2007/0110453 | A1 * | 5/2007 | Akiyama | G02B 6/12004 398/182 |
| 2009/0016399 | A1 * | 1/2009 | Bowers | B82Y 20/00 372/50.21 |
| 2009/0220228 | A1 | 9/2009 | Popovic | |
| 2009/0323755 | A1 * | 12/2009 | Okayama | G02B 6/12007 372/94 |
| 2009/0324163 | A1 * | 12/2009 | Dougherty | B82Y 20/00 385/14 |
| 2010/0141358 | A1 * | 6/2010 | Akyurtlu | H01P 1/20 333/219.1 |
| 2010/0284649 | A1 * | 11/2010 | Ishii | G02F 1/0147 385/31 |
| 2011/0273709 | A1 * | 11/2011 | Sweeney | G01J 3/02 356/320 |
| 2012/0063484 | A1 * | 3/2012 | Goddard | G02B 6/12007 372/94 |
| 2012/0081687 | A1 * | 4/2012 | Burrow | G02B 27/10 355/71 |
| 2012/0105177 | A1 | 5/2012 | McLaren | |
| 2013/0156368 | A1 * | 6/2013 | Hanjani | G02B 6/122 385/14 |
| 2013/0209020 | A1 * | 8/2013 | Doerr | G02F 1/011 385/2 |
| 2013/0279849 | A1 * | 10/2013 | Santori | G01N 21/7746 385/30 |
| 2014/0376001 | A1 * | 12/2014 | Swanson | A61B 5/0066 356/479 |
| 2015/0016767 | A1 * | 1/2015 | Akiyama | G02F 1/225 385/3 |

OTHER PUBLICATIONS

Written Opinion (PCT/ISA/237) mailed on Mar. 13, 2013, by the European Patent Office as the International Searching Authority for International Application No. PCT/EP2012/069935.
International Search Report (PCT/ISA/210) mailed on Jan. 7, 2013, by the European Patent Office as the International Searching Authority for International Application No. PCT/EP2012/069957.
Written Opinion (PCT/ISA/237) mailed on Jan. 7, 2013, by the European Patent Office as the International Searching Authority for International Application No. PCT/EP2012/069957.
International Search Report (PCT/ISA/210) mailed on Jan. 4, 2013, by the European Patent Office as the International Searching Authority for International Application No. PCT/EP2012/069928.
Written Opinion (PCT/ISA/237) mailed on Jan. 4, 2013, by the European Patent Office as the International Searching Authority for International Application No. PCT/EP2012/069928.
International Search Report (PCT/ISA/210) mailed on Jan. 16, 2013, by the European Patent Office as the International Searching Authority for International Application No. PCT/EP2012/069956.
Written Opinion (PCT/ISA/237) mailed on Jan. 16, 2013, by the European Patent Office as the International Searching Authority for International Application No. PCT/EP2012/069956.
International Search Report (PCT/ISA/210) mailed on Mar. 13, 2013, by the European Patent Office as the International Searching Authority for International Application No. PCT/EP2012/069934.
Written Opinion (PCT/ISA/237) mailed on Mar. 13, 2013, by the European Patent Office as the International Searching Authority for International Application No. PCT/EP2012/069934.
Japanese Office Action issued Nov. 8, 2016 in corresponding Japanese Patent Application No. 2014-535023.

* cited by examiner

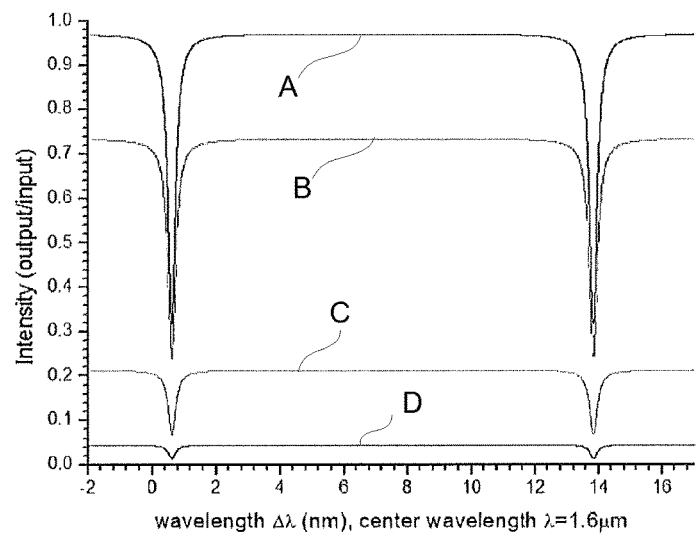
Fig. 3
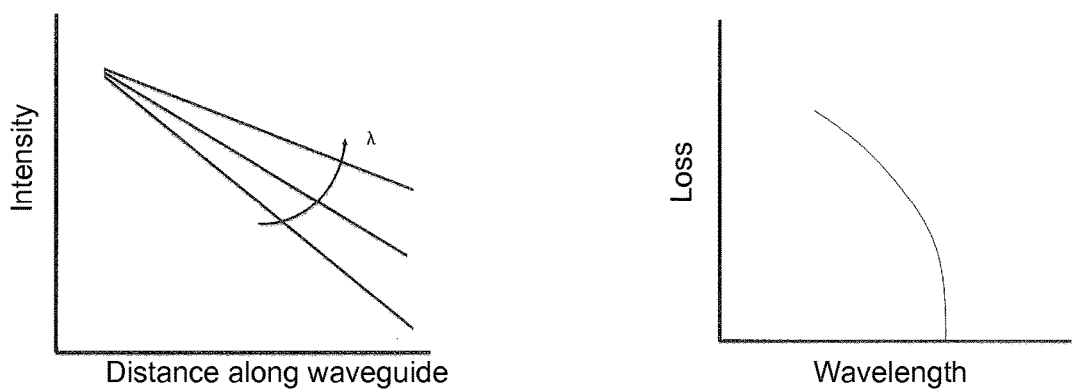
Fig. 4
Fig. 5

RESONATOR OPTIMISATION

FIELD OF THE INVENTION

The invention relates to the optimisation of resonators in a device. More particularly, but not exclusively, it relates to the optimisation of the order of resonators in a spectrometer.

BACKGROUND OF THE INVENTION

Resonators are used in many devices to allow detection of electromagnetic radiation of specific wavelengths. One type of device for detecting electromagnetic radiation is a spectrometer. Spectrometers are used in many applications for measuring properties of light across a range of wavelengths. For example, a spectrometer can be used for compositional analysis, by obtaining absorption or emission spectra for an object of interest. The presence and location of peaks within the spectra can indicate the presence of particular elements or compounds. Spectrometers are commonly used for analysis at optical wavelengths, but can also be used at other wavelengths such as microwave and radio wavelengths.

Spectrometers are typically relatively complex and expensive devices that require the alignment of a number of moving parts to be controlled with high precision. For example, a typical spectrometer may focus light onto a diffraction grating to split an incident beam into separate wavelengths, and the diffraction grating may be rotated to a specific angle to direct light of a particular wavelength towards a detector.

In recent years chip-based spectrometers have been developed which can be highly miniaturised, have no moving parts, and can be manufactured using well-established lithography techniques. WO2010128325 discloses a chip spectrometer without any moving parts. The chip spectrometer, which may be referred to as a spectrometer-on-a-chip, comprises a substrate onto which are patterned a waveguide and a plurality of disk resonators coupled to the waveguide. Light enters the waveguide at a first end and the resonators are arranged such that portions of the light in the waveguide are coupled into the disk resonators. Each resonator is arranged to support a resonant mode at a particular wavelength such that only light of that wavelength is coupled into the resonator. On top of each disk resonator is an electrode for detecting current that is proportional to the amount of light present in that resonator. The current detected in each resonator therefore indicates the amount of light at that wavelength that was present in the input beam of light. Each electrode is further connected to a signal bond pad for connecting the spectrometer to an external device for measuring the current. In WO2010128325, all the disk resonators work at the same resonance order and the larger the resonant mode wavelength of a disk resonator, the larger the size of the disk resonator. Moreover, the disk resonators are arranged on the substrate such that the larger the size of a disk resonator the further away from entrance to the waveguide the disk resonator is located.

The invention is made in this context.

SUMMARY OF THE INVENTION

According to the invention, there is provided a device comprising: a substrate; a plurality of resonators on the substrate, each of the resonators of the plurality of resonator being resonant at a predetermined wavelength of electromagnetic radiation and at least some of the resonators being arranged to operate in different resonance orders; a waveguide on the substrate, the waveguide being coupled to the plurality of resonators for guiding the electromagnetic radiation to the plurality of resonators, wherein the resonance order of each resonator along the waveguide is optimised to maximise the coupling of light into the resonators.

By configuring the resonators in the device to work in different resonance orders, the resolution and the sensitivity of the device can be improved.

By selecting an appropriate order and position for each resonator, the coupling of light into each resonator can be maximised, thereby maximising the detected signal and minimising noise. By reducing the background loss at each wavelength, the resonance quality factor (Q) is maximised leading to an improvement in the spectral resolution of the spectrometer chip.

Each resonator may operate in an order determined to minimise bend losses in the resonator, to provide a free-spectral range of the resonator that is larger than the operating spectral bandwidth of the device.

The device may be configured to detect electromagnetic radiation in a range of wavelengths, the range of wavelengths comprising adjacent wavelengths and two resonators resonant at adjacent wavelengths may operate in different orders. When resonators for adjacent wavelengths have the same order, the resonators are of similar size. There are limitations to the precision with which resonators can be manufactured and if two resonators for adjacent wavelengths have similar sizes, the precision limitations may result in one of the resonators coupling light at the target wavelength of the other resonator. By allowing the resonators to have different orders, the resonators are easier to manufacture.

The position of each resonator along the waveguide may be optimised to minimise the loss of the radiation at the wavelengths of interest in the waveguide.

A resonator of the plurality of resonators with a shorter resonant wavelength may be positioned closer to a beginning of the waveguide than a resonator of the plurality of resonators with a longer resonant wavelength.

The resonators may be any high Q cavity. For example, the resonators may be disk resonators.

According to the invention, there is also provided a spectrometer comprising the device.

According to the invention, there is also provided a method of optimising a device comprising a substrate, a plurality of resonators on the substrate, each of the plurality of resonators being resonant at a predetermined wavelength of electromagnetic radiation, and a waveguide on the substrate, the waveguide being coupled to the plurality of resonators for guiding the electromagnetic radiation to the plurality of resonators, the method comprising: selecting the wavelengths of interest; determining a target wavelength for each resonator from the wavelengths of interest; determining the resonance order of each resonator of the plurality of resonators such that the resonant wavelength of the resonator falls at the target wavelength for that resonator and such that the resonance depth is increased, the resonance order of at least one resonator being different to the resonance order of at least one other resonator of the plurality of resonators.

Determining the order of each resonator may comprise determining an order that provides a free-spectral range of the resonator that is larger than the operating spectral bandwidth of the device and such that the bend loss of the resonator is reduced.

The wavelengths of interest may include a set of wavelengths comprising adjacent wavelengths and determining the order may further comprise determining the order of a resonator such that the size of the resonator is considerably different to the size of resonators for coupling lights at adjacent wavelengths.

The method may further comprise determining the position of each resonator, relative to the other resonators, along the waveguide to minimise the loss of the radiation at the wavelengths of interest in the waveguide.

Determining the position of the resonator may comprise placing a resonator of the plurality of resonators with a shorter resonant wavelength closer to the beginning of the waveguide than each resonator of the plurality of resonators with a longer resonant wavelength.

The plurality of resonators may be disk resonators.

According to the present invention, there is also provided a device comprising: a substrate; a plurality of resonators on the substrate, each of the resonators of the plurality of resonators being resonant at a predetermined wavelength of the electromagnetic radiation; and a waveguide on the substrate, the waveguide being coupled to the plurality of resonators for guiding the electromagnetic radiation to the plurality of resonators, wherein the resonance order of each resonator along the waveguide is optimised according to the method. The position of each resonator along the waveguide may also be optimised according to the method.

BRIEF DESCRIPTION OF THE DRAWINGS

Embodiments of the invention will now be described, by way of example, with reference to FIGS. 1 to 7 of the accompanying drawings, in which:

FIG. 3 is a graph illustrating the variation in output intensity for a plurality of waveguides of different lengths;

FIG. 4 is a graph showing how the intensity varies with the distance along the waveguide;

FIG. 5 illustrates how the loss in the waveguide decreases with wavelength;

DETAILED DESCRIPTION

Figure 1:
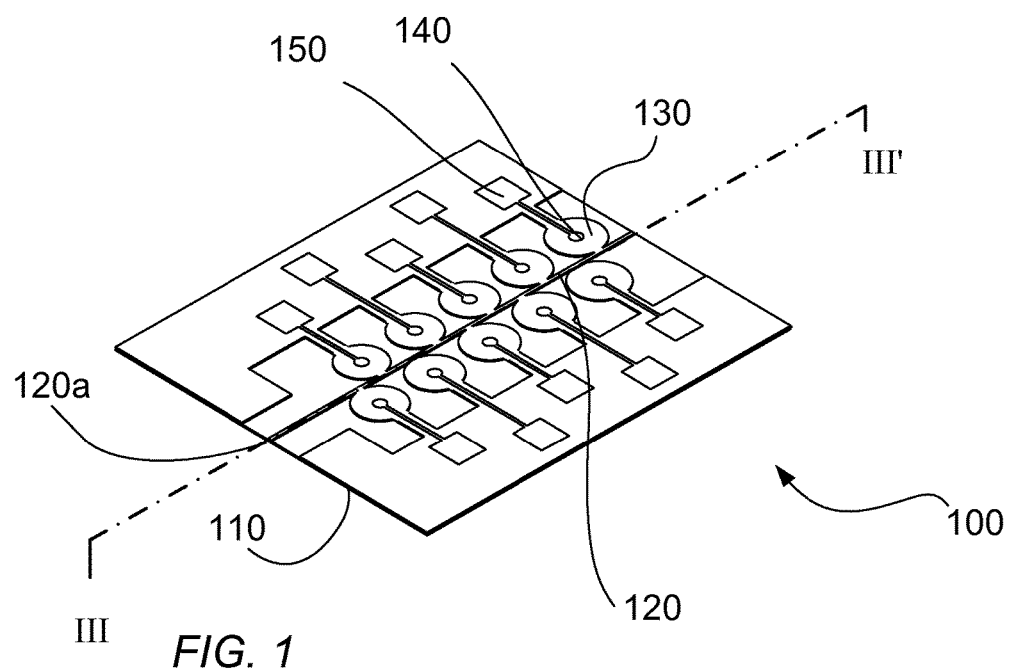
FIG. 1 is a perspective diagram of a spectrometer chip.

With reference to FIG. 1, a perspective view of a spectrometer is shown. The spectrometer is a spectrometer-on-a-chip comprising a substrate 110, onto which are patterned an elongate waveguide 120 and a plurality of disk resonators 130 coupled to the waveguide. Light enters the waveguide at one end 120a and each resonator 130 is arranged to support a resonant mode at a particular wavelength such that only light of that wavelength is coupled into the resonator 130. On top of each disk resonator 130 is an electrode 140 for detecting current that is proportional to the amount of light present in that resonator. The current detected in each resonator therefore indicates the amount of light at that wavelength that was present in the input beam of light. Each electrode 140 is further connected to a signal bond pad 150 for connecting the spectrometer 100 to an external device for measuring the current. It should be realised that although the resonators 130 are described as separate from the waveguide 120, the resonators may be considered part of the waveguide. The waveguide may be a ridge waveguide.

Figure 2:
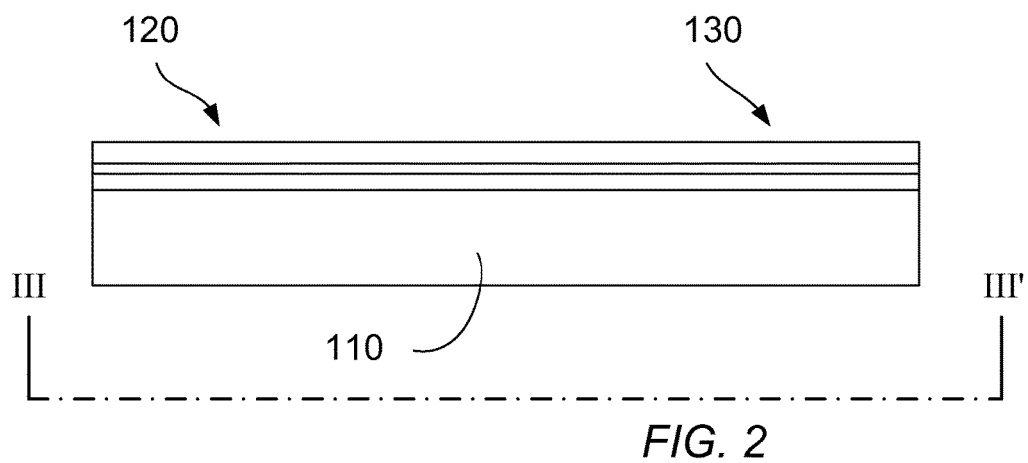
FIG. 2 shows the cross-section of the spectrometer chip of FIG. 1.

A cross section of the spectrometer chip along lines III-III' of FIG. 1 is shown in FIG. 2. As shown, a number of layers are deposited on top of the substrate 110. FIG. 2 only shows a small number of layers and it will be appreciated that the structure can include additional layers. The substrate may be manufactured from any suitable type of semiconductor. For example, the substrate may be formed from n-doped Indium Phosphide (InP) with a dopant concentration of about 1-3× $10^{18}$ cm$^{-3}$. On top of the substrate there may be provided an etch-stop layer (not shown), which prevents etching of the substrate, and on top of the etch-stop layer there may be provided a support layer (not shown). As an example, an etch-stop layer may be formed from n-doped InGaAsP with a dopant concentration of 0.18-1.2×$10^{18}$ cm$^{-3}$ and the support layer may be formed from n-doped InP with a dopant concentration of 4-6×$10^{17}$ cm$^3$. The waveguide 120 and the resonators 130 are then provided as one or more layers on top of the support layer. As an example, the layers may be formed from undoped InGaAsP. On top of the one or more layers forming the waveguide and the resonators there may be formed a capping layer (not shown). The capping layer may be formed from p-doped InP with a dopant concentration of about 2×$10^{18}$ cm$^{-3}$. There may also be provided an isolation layer for metallisation on top of the capping layer.

The one or more layers that provide the waveguide 120 and the resonators 130 may have a higher refractive index than the support layer and the capping layer and the waveguide is formed from the refractive index contrast between the layers forming the waveguide and the support and capping layers. It will be appreciated that the layer structure described above is just an example and one or more layers may be removed or replaced. For example, the structure may not include a support layer in which case the waveguide is formed from the contrasting refractive index between the one or more waveguide layers, the substrate and the capping layers. The one or more layers for the waveguide 120 and resonators 130 may comprise a layer with a band gap designed to absorb the radiation. It may be designed to have a low absorption coefficient to limit the absorption in the waveguide while allowing the radiation to be absorbed in the resonators. The one or more layers may include a thin active absorbing layer sandwiched between two cladding layers. The cladding layers may form the optical waveguide. The thin absorbing layer may be provided with a smaller band gap than the cladding layers. In some embodiments, the absorbing layer is a quantum well. The layers may be grown by molecular beam epitaxy or chemical vapour deposition which can control the layer thickness down to monolayers. The quantum well is sufficiently thin to have little or no influence on the radiation in the waveguide. For example, it may have a thickness of approximately 3 nm. The radiation that enters the resonators 130 is absorbed in the quantum well provided in the resonators. The structure of the layers ensures that the optical field is at a maximum over the quantum well which helps to increase absorption.

In general, the capping layer, the support layer and the cladding layers may have band gaps that are greater than the highest-energy photon of interest. In contrast, the active absorbing layer, sandwiched between the cladding layers, has a band gap that is less than the lowest-energy photon of interest, i.e. lower than the energy of a photon of the longest wavelength that the spectrometer is configured to detect. In this way, the composition of the active layer can be used in all disk resonators 130 in the spectrometer. As mentioned above, when the absorbing layer is a quantum well, it is sufficiently thin to have little or no influence on the optical field in the waveguide. When light of a particular wavelength enters the resonator from the waveguide, it travels multiple cycles around the resonator and the photons are absorbed by the material in the active layer as the band gap is sufficiently low for even the lowest-energy photons to excite electrons from the valence band into the conduction band, generating electron-hole pairs. The resulting current can be measured, and is proportional to the amount of light energy in the disk resonator. However, it should be realised that the structure does not have to be uniform across the resonators 130 and the waveguide 120. The absorbing layer may not be provided in the waveguide. The absorbing layer in the waveguide 120 can be selectively etched and replaced by a wider band-gap alloy or the absorbing layer may only be deposited in the disk resonators 130 in the first place.

It will of course be appreciated that the present invention is not limited to the layer structure shown in FIG. 2 and described above, and in other embodiments other structures may be used.

In conventional spectrometers, all disk resonators typically operate in the same resonance order. According to the invention, at least some of the resonators operate in different orders. The order and the precise position of each disk resonator along the waveguide are optimised to maximise the coupling of light into the disk.

In more detail, the wavelength to be absorbed by the disk resonator and the order of the disk resonator generally determines the size of the disk resonator. Simplistically, the diameter D can be considered to be determined by the formula $D=n\lambda/\pi\mu$ where $\lambda$ is the free space wavelength of the radiation, n is the resonance order and $\mu$ is the effective refractive index of the resonator. In reality, the relationship between the diameter and the wavelength and order is more complex, as will be appreciated by the skilled person. However, it should be realised that the wavelength scales as D/n. Consequently, the higher the diameter, the higher the order for any given wavelength.

FIG. 3 illustrates that the length of the waveguide between the entrance and the disk resonators influences the quality of the resonance. The graph is obtained for a device with a single disk resonator located half way along the waveguide. In other words, half the length of the waveguide is provided on each side of the resonator. The disk resonator has a radius of 8 µm and the active layer is provided by a 3 nm deep quantum well with a band gap corresponding to a wavelength of 1.65 µm sandwiched between two cladding layers with a band gap corresponding to a wavelength of 1.45 µm. Light having a range of wavelengths with a centre wavelength of 1.6 µm is coupled into the waveguide. The graph shows the ratio of the output intensity to the input intensity in the waveguide, against the wavelength of the radiation. A dip in the curve shows that light at a wavelength corresponding to the position of the dip along the x-axis is coupled into, and absorbed by, the disk resonator. In the graph, curve A is for a 20 µm waveguide, curve B is for a 200 µm waveguide, curve C is for a 1000 µm waveguide and curve D is for a 2000 µm waveguide. From FIG. 3 it is clear that the longer the distance between the entrance to the waveguide and the disk resonator, the greater the amount of light that is absorbed. Consequently, the distance the radiation has to travel in the waveguide influences the quality of the resonance.

If more energy is absorbed in the disk, the resonance dips in the curve of FIG. 3 will be deeper as more of the input energy is absorbed by the disk instead of being transferred to the end of the waveguide. As would be expected, since the waveguide absorbs some radiation, it can be seen from FIG. 3 that the longer the waveguide the smaller the proportion of light transferred to the end of the waveguide. This also means that the transmission of light along the waveguide relative to that absorbed by the disk is strongly dependent upon the length of the waveguide. Thus a shorter waveguide gives rise to a deeper resonance and hence a higher cavity quality (Q) factor.

For a resonator working in the first order, there is only one mode of resonance. However, for resonators operating in higher orders, that are more than one modes of resonance. As shown in FIG. 3, a first resonant mode for the particular disk resonator for which the graph is generated is provided at approximately 0.7 nm above the centre wavelength and another resonant mode is provided at approximately 13.9 nm above the centre wavelength. The wavelength range between the resonant modes is referred to as the free-spectral range (FSR).

It is desired that the free spectral range of each disk resonator is larger than the wavelength range of interest such that each resonator only couples radiation guided along the waveguide of a single wavelength. The higher the order and the larger the size of the disk resonator, the smaller the free spectral range. Consequently, there is a limit on how large a disk resonator can be and a limit to how high the order in which the disk resonator can operate.

Moreover, bend losses increase when the disk resonators are smaller. If the radius of a disk resonator is decreased beyond a specific radius determined by the specific wavelength at which the resonator is resonant, radiation circulating around the disk resonator escapes the disk resonator as it reaches the edge of the disk resonator. In other words, the angle of incidence on the side walls of the disk resonator may decrease for a smaller disk resonator, resulting in that a smaller proportion of the light is reflected back into the disk resonator and a larger proportion of light evanescently "leaks" at the edges of the disk resonator. The bend loss in the resonator changes the degree of coupling between the waveguide and the disk. The depth of the resonance weakens for higher bend losses in smaller disks. Consequently, there is a limit to how small a disk resonator can be and a limit to how low the order that can be used.

For a given wavelength, there is therefore an optimum size for the disk resonator. The order of the resonator is chosen to give a disk resonator of an appropriate size.

In some embodiments, the order of each disk resonator is chosen such that:
 i) the free-spectral range is larger than the operating spectral bandwidth of the spectrometer chip
 ii) the bend loss of the disk can be minimised and the resonance depth maximised
 iii) the wavelength falls within the spectral window of interest and at a particular target wavelength.

Once the order has been chosen, the optimum position is chosen to ensure that the maximum amount of light at each wavelength couples into each disk. The further the radiation travels in the waveguide, the higher the proportion of the light that is absorbed in the waveguide. However, the disk resonators cannot all be located near the entrance to the waveguide. The disk resonators all have a certain size and there is also a limit to how closely together the disk resonators can be arranged. If the disk resonators are located too closely together, coupling may occur between the disks changing the resonance wavelengths and impeding the wavelength selectivity of the resonators. It is contemplated that in some spectrometers the disk resonators are spaced apart by at least 1 µm.

As illustrated with respect to FIGS. 4 and 5, the shorter the wavelength of the radiation, the higher the loss in the waveguide. FIG. 4 shows how the intensity of radiation of different wavelengths decreases the further the radiation travels along the waveguide. It is clear that the intensity decreases at a higher rate when the wavelength is shorter. FIG. 5 shows the relationship between loss and the wavelength. The line intersects the x-axis at the wavelength corresponding to the band gap of the material of the active absorbing layer in the resonators, for example a quantum well. It is clear from FIG. 5 that the longer the wavelength, the lower the loss in the waveguide.

According to embodiments of the invention, the location of a disk resonator is chosen such that the loss is minimised in view of the loss in the waveguide for different wavelengths. In other words, a disk resonant at a shorter wavelength should be placed closer to where the light enters the spectrometer chip than a disk resonant at a longer wavelength. By choosing the location of a disk resonator such that the loss is minimised in the waveguide, the difference in loss between the resonators and the waveguide is maximised. Accordingly, the depth of the resonance and thereby the Q factor of each resonator is also maximised, resulting in an optimised resolution. To this end, the disks are ordered along the waveguide based on wavelength. In other words, a disk resonator with a specific resonance wavelength is placed closer to the waveguide entrance than disk resonators with resonance wavelengths longer than the specific wavelength and further away from the entrance than the disk resonators with a shorter resonance wavelength than the specific waveguide.

Additionally, precision is an issue in the semiconductor industry. Typically, semiconductor components can be manufactured with a precision of 100 nm. If the same order is used, the difference in size of two disk resonators configured to be resonant at similar wavelengths can be very similar and manufacture will be costly and difficult. By using an approach in which the order is a flexible parameter, resonators configured to resonate at adjacent wavelengths can be designed to have significantly different sizes. This makes manufacture easier. If a resonator resonant at a particular wavelength is manufactured with a diameter which is sufficiently larger or sufficiently smaller than intended, the resonator may also couple radiation at an adjacent target wavelength. However, if the resonators work in different orders, the sizes are significantly different and the manufacturing error may be sufficiently small to avoid the resonator also resonating at target wavelengths of other resonators in the device. Consequently, when deciding the order and the size of a particular resonator, the orders and the sizes of disk resonator for adjacent wavelengths may also be considered. In some embodiments, the disks sizes for disk resonators resonating at adjacent wavelengths are chosen to be as different as possible to allow for manufacturing uncertainties.

Figure 6:
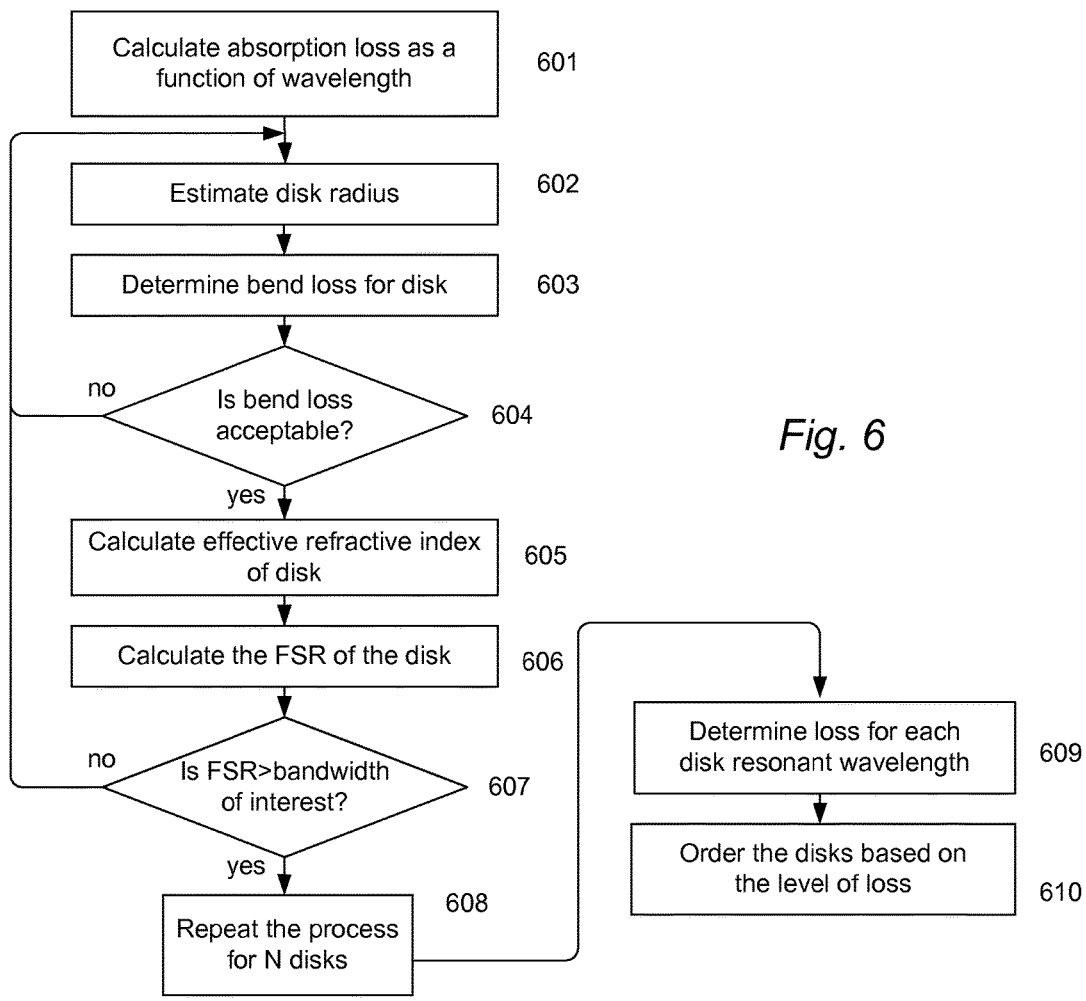
FIG. 6 illustrates a process for optimising the arrangement of disk resonators in the spectrometer.

With reference to FIG. 6, a process for optimising the size and location of each disk resonators may comprise first calculating the absorption loss as a function of wavelength (step 601). The degree of absorption loss depends on the composition and thickness of any absorbing layer in the waveguide. The composition and thickness of the absorbing layer, for example a quantum well, is chosen to achieve a band gap smaller or equal to the longest wavelength photon energy to be measured. The disk radius for a first disk resonator is then estimated (step 602). The disk radius is determined such that the disk resonator couples light of a particular target wavelength from the range of wavelengths of interest. The particular disk radius determined will correspond to a specific order of resonance. The bend loss of the disk at the estimated disk radius is then determined (step 603). Moreover, it is determined whether the bend loss is below an acceptable limit (step 604), by examining the quality of resonance. If the bend loss is not less than the acceptable limit, steps 602 to 604 are repeated until a radius giving an acceptable bend loss is found. If the bend loss is found to be acceptable in step 604, then the effective refractive index is calculated (step 605). The refractive index is linked to the absorption loss determined in step 601. The free spectral range is then calculated for the disk (step 606), based on the refractive index calculated in step 605, and it is determined whether the free spectral range is larger than bandwidth of interest in the spectrometer (step 607). If the free spectral range is not larger than the bandwidth of interest, steps 602 to 607 are repeated for another possible disk radius. The new estimated disk radius may correspond to a different order of resonance than the initial estimated disk radius. The initial estimated disk radius may be adjusted by a predetermined amount to obtain the new disk radius. The predetermined amount may depend on the desired resonant wavelength for the disk resonator.

If the free spectral range is larger than the bandwidth of interest, the process of steps 602 to 607 is repeated for all the disks (step 608). The loss for each disk resonance wavelength is then determined (step 609) and the disks are ordered based on the loss (step 610). In more detail, the disk with the highest loss is given the position closest to the waveguide optical input, followed by the next highest loss and so on until all the disks are ordered. The position is determined so that loss is minimised and such that the Q factor of each resonator is maximised. Since the loss in the waveguide is higher for lower wavelengths, the disks may be positioned along the waveguide based on their resonant wavelengths, with the disk with the shortest resonant wavelength closest to the input end of the waveguide. In some embodiments the step of ordering the disks based on losses (step 610) is omitted, and instead the disks can be positioned in any order along the waveguide.

It will be appreciated that although a specific order for the processing steps of FIG. 6 has been described, the order can be varied.

As mentioned above, in some embodiments, the same absorbing layer may be present in both the waveguide and the resonators. The composition and thickness of this absorbing layer can itself be optimised in order to provide a maximum Q factor for a given set of disk radii, i.e. the radii calculated using the method of FIG. 6. Changing the composition and thickness can also affect the absorption loss in the waveguide, as described above with reference to step 601. Therefore after optimising the composition and thickness for this set of radii, the method of FIG. 6 can again be repeated using the new composition and thickness to determine whether to further adjust any of the disk radii and/or positions on the waveguide. This can be an iterative process, involving repeatedly optimising the disk radii and ordering, optimising the absorbing layer composition and thickness, adjusting the disk radii and ordering for the new absorbing layer, and so on. The process may be repeated until a predetermined criteria is fulfilled, for example until acceptable losses are achieved or until the process has been repeated a certain number of times. In some embodiments each optimisation process could only be carried out once, or the absorbing layer optimisation may not be carried out at all.

It should be realised that the above described optimisation process is just exemplary and modifications are contemplated. For example, as mentioned above, the size and order may also be chosen with consideration to the orders and sizes of disks for coupling light at adjacent wavelengths to the target wavelength for the disk resonator. The order may be chosen such that the size of the disk is substantially different to the sizes of the disks for coupling radiation at adjacent wavelengths.

Figure 7:
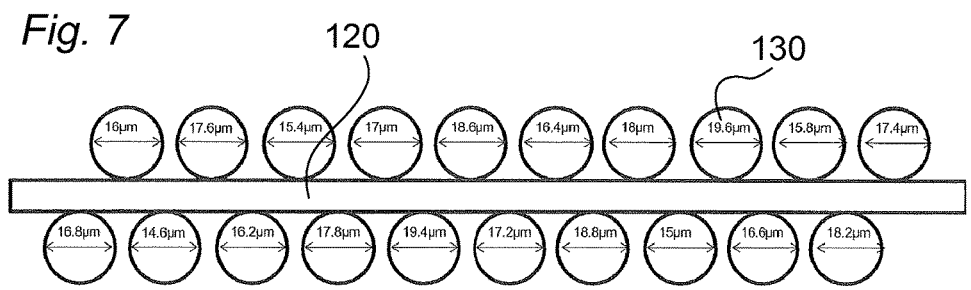
FIG. 7 illustrates an optimised arrangement of disk resonators for a particular spectrometer.

One example of an optimised arrangement of disks along a waveguide is shown with respect to FIG. 7. The specific disk arrangement is for a spectrometer for detecting wavelengths in the range 1600 to 1610 nm. As can be seen from FIG. 7, the disk resonators have different diameters but there is no correlation between the size of a resonator and the location of the resonator along the waveguide.

Whilst specific examples of the invention have been described, the scope of the invention is defined by the appended claims and not limited to the examples. The invention could therefore be implemented in other ways, as would be appreciated by those skilled in the art.

For example, it will be appreciated that the spectrometer, with respect to which embodiments of the invention have been described, may be considered to be, or form part of, a spectrophotometer. Therefore, where the term "spectrometer" has been used, the term could have been replaced with the term "spectrophotometer".

It should also be realised that although the optimisation of the order has been described for a spectrometer, the optimisation process can be used for disk resonators for any device for detecting electromagnetic radiation. Furthermore, although a spectrometer has been described in places to receive and guide light, embodiments of the present invention can be used to guide and detect electromagnetic radiation of any wavelength. The invention can be used for optimising the arrangement of disk resonators in photonic integrated circuits, optical sensors and systems and optical communication devices, including Add-Drop Multiplexers for optical communications. Moreover, the resonators do not have to be disk resonators. The resonators can be any high Q cavities, such as spherical resonators, microrings etc.

Also, it should be noted that it is the overall coupling of light into the plurality of resonators as a whole that is maximised when the order is optimised, rather than the coupling into each individual resonator being maximised. To maximise the coupling of light into the resonators, it may be necessary to compromise between resonators. For example, the coupling into one resonator may be reduced by moving that resonator further from the input end of the waveguide, in order to achieve a greater increase in coupling into another resonator which can be moved closer to the input end of the waveguide.

The invention claimed is:

1. A device configured to detect electromagnetic radiation within a range of wavelengths, the device comprising:
   a substrate;
   a plurality of resonators on the substrate, each of the resonators of the plurality of resonators being resonant at a predetermined wavelength of electromagnetic radiation within said range of wavelengths, and at least some of the resonators being arranged to operate in different resonance orders within said range of wavelengths; and
   a waveguide on the substrate, the waveguide being coupled to the plurality of resonators for guiding electromagnetic radiation to the plurality of resonators, wherein a resonance order of each resonator along the waveguide is selected to provide a maximum coupling of light into the resonators,
   wherein said range of wavelengths is a range defined by an operating spectral bandwidth of the device, and
   wherein the plurality of resonators includes a plurality of resonator pairs each having two resonators arranged to be resonant at adjacent wavelengths, and the resonators within each resonator pair are arranged to operate in different orders.

2. A device according to claim 1, wherein each resonator operates in an order selected to provide minimum bend losses in the resonator, and to provide a free-spectral range of the resonator that is larger than an operating spectral bandwidth of the device.

3. A device according to claim 1, wherein a position of each resonator along the waveguide is selected to provide a minimum loss of radiation at predetermined wavelengths of interest in the waveguide.

4. A device according to claim 3, wherein a resonator of the plurality of resonators with a shorter resonant wavelength is positioned closer to a beginning of the waveguide than a resonator of the plurality of resonators with a longer resonant wavelength.

5. A device according to claim 1, wherein the plurality of resonators are disk resonators.

6. The device of claim 1, wherein the device is included in a spectrometer.

7. A device configured to detect electromagnetic radiation within a range of wavelengths, the device comprising:
   a substrate;
   a plurality of resonators on the substrate, each of the resonators of the plurality of resonators being resonant at a predetermined wavelength of electromagnetic radiation within said range of wavelengths; and
   a waveguide on the substrate, the waveguide being coupled to the plurality of resonators for guiding the electromagnetic radiation to the plurality of resonators, wherein a resonance order of each resonator along the waveguide is selected according to a method including:
      selecting predetermined wavelengths of interest;
      determining a target wavelength for each resonator from the wavelengths of interest; and
      determining the resonance order of each resonator of the plurality of resonators such that the resonant wavelength of the resonator falls at the target wavelength for that resonator and such that resonance depth is increased, a resonance order of at least one resonator being different than a resonance order of at least one other resonator of the plurality of resonators,
   wherein said range of wavelengths is a range defined by an operating spectral bandwidth of the device, and
   wherein the plurality of resonators includes a plurality of resonator pairs each having two resonators arranged to be resonant at adjacent wavelengths, and the resonators within each resonator pair are arranged to operate in different orders.

8. A device according to claim 7, wherein a position of each resonator along the waveguide is selected by placing a resonator of the plurality of resonators with a shorter resonant wavelength closer to a beginning of the waveguide than a resonator of the plurality of resonators with a longer resonant wavelength.

9. A device according to claim 2, wherein a position of each resonator along the waveguide is selected to provide a minimum loss of radiation at predetermined wavelengths of interest in the waveguide.

10. A device according to claim 9, wherein a resonator of the plurality of resonators with a shorter resonant wavelength is positioned closer to a beginning of the waveguide than a resonator of the plurality of resonators with a longer resonant wavelength.

11. A device according to claim 10, wherein the plurality of resonators are disk resonators.

12. The device of claim 11, wherein the device is included in a spectrometer.

* * * * *